(12) United States Patent
Bunker et al.

(10) Patent No.: US 7,373,778 B2
(45) Date of Patent: May 20, 2008

(54) COMBUSTOR COOLING WITH ANGLED SEGMENTED SURFACES

(75) Inventors: Ronald Scott Bunker, Niskayuna, NY (US); Jeremy Clyde Bailey, Middle Grove, NY (US); Stanley Kevin Widener, Greenville, SC (US); Thomas Edward Johnson, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/711,131

(22) Filed: Aug. 26, 2004

(65) Prior Publication Data

US 2006/0042255 A1  Mar. 2, 2006

(51) Int. Cl.
    *F02C 1/00* (2006.01)
(52) U.S. Cl. .................................. 60/752; 431/351
(58) Field of Classification Search .......... 60/752–760, 60/772, 722; 431/351–353, 243, 11; 165/169, 165/109.1
See application file for complete search history.

(56) References Cited

U.S. PATENT DOCUMENTS

| | | | | |
|---|---|---|---|---|
| 4,195,475 A | * | 4/1980 | Verdouw | 60/754 |
| 5,337,568 A | * | 8/1994 | Lee et al. | 60/755 |
| 5,361,828 A | * | 11/1994 | Lee et al. | 165/109.1 |
| 5,791,405 A | * | 8/1998 | Takiura et al. | 165/184 |
| 5,802,841 A | * | 9/1998 | Maeda | 60/784 |
| 5,803,600 A | * | 9/1998 | Schubert et al. | 366/144 |
| 5,974,805 A | * | 11/1999 | Allen | 60/740 |
| 6,018,950 A | * | 2/2000 | Moeller | 60/752 |
| 6,098,397 A | | 8/2000 | Glezer et al. | 30/39.02 |
| 6,134,877 A | * | 10/2000 | Alkabie | 60/800 |
| 6,298,909 B1 | * | 10/2001 | Fukatami et al. | 165/133 |
| 6,340,050 B1 | * | 1/2002 | Mori et al. | 165/133 |
| 6,446,438 B1 | * | 9/2002 | Kraft et al. | 60/737 |
| 6,526,756 B2 | * | 3/2003 | Johnson et al. | 60/772 |
| 6,530,225 B1 | * | 3/2003 | Hadder | 60/772 |
| 6,546,730 B2 | * | 4/2003 | Johnson et al. | 60/752 |
| 6,681,578 B1 | * | 1/2004 | Bunker | 60/772 |
| 6,722,134 B2 | * | 4/2004 | Bunker | 60/752 |
| 6,883,597 B2 | * | 4/2005 | Thors et al. | 165/133 |
| 6,929,058 B2 | * | 8/2005 | Liu et al. | 165/80.3 |
| 2005/0044857 A1 | * | 3/2005 | Glezer et al. | 60/772 |
| 2006/0016582 A1 | * | 1/2006 | Hashimoto et al. | 165/109.1 |

OTHER PUBLICATIONS

J.C. Han et al; "High performance heat transfer ducts with parallel broken and V-shaped broken ribs;" Int. J. Heat Duct Transfer, vol. 35, No. 2, 1992, pp. 513-523.

(Continued)

*Primary Examiner*—William H. Rodriguez
(74) *Attorney, Agent, or Firm*—Cantor Colburn LLP

(57) ABSTRACT

A combustor liner for a gas turbine includes a body having a plurality of angled strips on an outside surface of the combustor liner. The plurality of angled strips are arranged in an array about the outside surface. A space is disposed between each of said plurality of angled strips so as to create vortices in a cooling air flowing in a longitudinal direction across said outside surface of said combustor liner. A method of fabricating a combustor liner includes forming a plurality of angled strips on an outside surface of the combustor liner and arranged in an array about the outside surface, each of the angled strips is disposed so as to be spaced apart to create vortices in a cooling air flowing across the outside surface of the combustor liner.

19 Claims, 5 Drawing Sheets

OTHER PUBLICATIONS

Robert Kiml et al.; "Heat Transfer Enhancement Mechanism in a Rectangular Passage with V- and A- Shaped Ribs;" Journal of Flow Visulation & Image Processing, vol. 8; 2001; pp. 51-68.

D. H. Rhee et al.; "Effects of Duct Aspect Ratios on Heat/Mass Transfer with Discrete V-Shaped Ribs;" Proceedings of ASME Turbo Expo 2003; pp. 1-4.

* cited by examiner

COMBUSTOR COOLING WITH ANGLED SEGMENTED SURFACES

BACKGROUND OF THE INVENTION

This invention relates generally to turbine components and more particularly to a combustor liner.

Conventional gas turbine combustors use diffusion (i.e., non-premixed) combustion in which fuel and air enter the combustion chamber separately. The process of mixing and burning produces flame temperatures that can exceed 3900 degrees F. Since conventional combustors and/or transition pieces having liners are generally capable of withstanding for about ten thousand hours (10,000 hrs.), a maximum temperature on the order of about 1500 degrees F., steps to protect the combustor and/or transition piece must be taken. This has typically been done by film-cooling which involves introducing relatively cool compressor air into a plenum formed by the compressor discharge case surrounding the outside of the combustor. In this prior arrangement, the air from the plenum passes through louvers in the combustor liner and then passes as a film over the inner surface of the liner, thereby maintaining combustor liner temperature at an acceptable level.

Because diatomic nitrogen rapidly disassociates at temperatures exceeding about 3000° F. (about 1650° C.) and reacts readily with oxygen at such temperatures, the high temperatures of diffusion combustion result in relatively high NOx emissions. One approach to reducing NOx emissions has been to premix the maximum possible amount of compressor air with fuel. The resulting lean premixed combustion produces cooler flame temperatures and thus lower NOx emissions. Although lean premixed combustion is cooler than diffusion combustion, the flame temperature is still too hot for prior conventional combustor components to withstand without some type of active cooling.

Furthermore, because the advanced combustors premix the maximum possible amount of air with the fuel for NOx reduction, little or no cooling air is available, making film-cooling of the combustor liner and transition piece impractical. Nevertheless, combustor liners require cooling to maintain material temperatures below limits. In dry low NOx (DLN) emission systems, this cooling can only be supplied as cold side convection. Such cooling must be performed within the acceptable limits of thermal gradients and pressure loss. Thus, means such as thermal barrier coatings in conjunction with "backside" cooling have been utilized to protect the combustor liner and transition piece from destruction by such high heat. Backside cooling involves passing the compressor air over the outer surface of the combustor liner and transition piece prior to premixing the air with the fuel.

There are currently three forms of prior art for the convective cooling of combustor chambers. First, a series of longitudinal or axially spaced horizontal turbulators, which appear as straight lines across the surface of the liner, are used in practice to disrupt the thermal boundary layer and provide enhanced heat transfer for cooling. These turbulators are either machined in the metal surface, or applied as tack-welded strips of material to the metal. Second, convective cooling is provided by a series of impingement jets supplied by the external combustor chamber cooling flow sleeve. Typically, it is not possible to provide such impingement cooling over the entire extent of the chamber, and so some mixture of impingement and surface turbulators is employed. Third, an array of surface indentations, also known as dimples or hemispherical concavities, is made in the liner surface to create flow vortices that act to enhance heat transfer. The various known techniques enhance heat transfer but with varying effects on thermal gradients and pressure losses.

BRIEF DESCRIPTION OF THE INVENTION

Exemplary embodiments of the invention include a combustor liner for a gas turbine that has a body having a plurality of angled strips on an outside surface of the combustor liner. The plurality of angled strips are arranged in an array about the outside surface. A space is disposed between each of said plurality of angled strips so as to create vortices in a cooling air flowing in a longitudinal direction across said outside surface of said combustor liner.

Exemplary embodiments of the invention also include a method of fabricating a combustor liner. The method includes forming a plurality of angled strips on an outside surface of the combustor liner and arranged in an array about the outside surface, each of the angled strips is disposed so as to be spaced apart to create vortices in the cooling air flowing across the outside surface of the combustor liner.

DETAILED DESCRIPTION OF THE INVENTION

Figure 1:
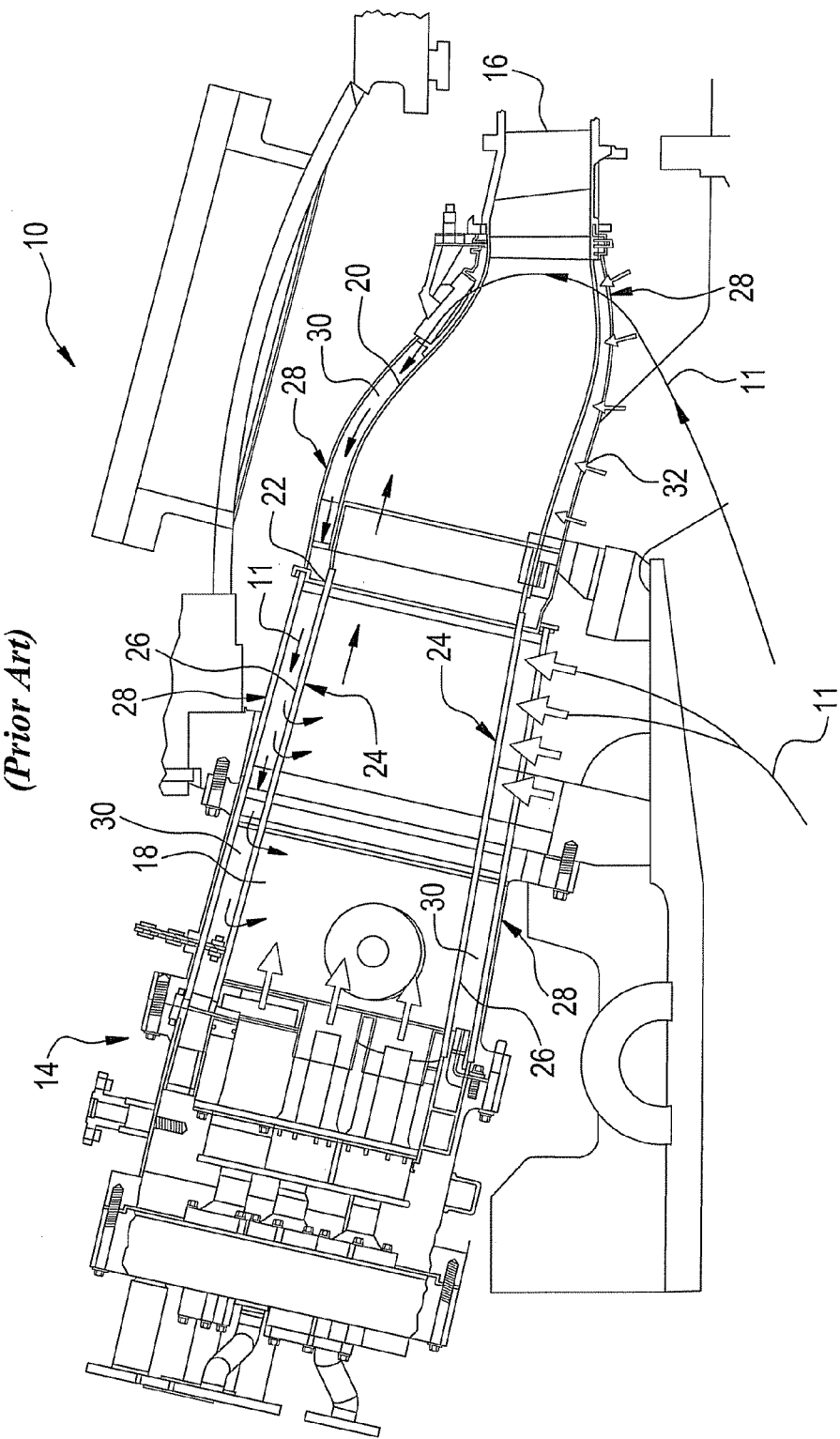
FIG. 1 is a schematic representation of a known gas turbine combustor.
Figure 2:
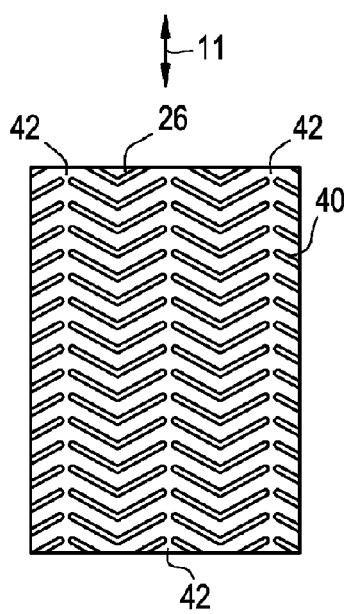
FIG. 2 illustrates a top view of an outside surface of a combustor liner.
Figure 3:
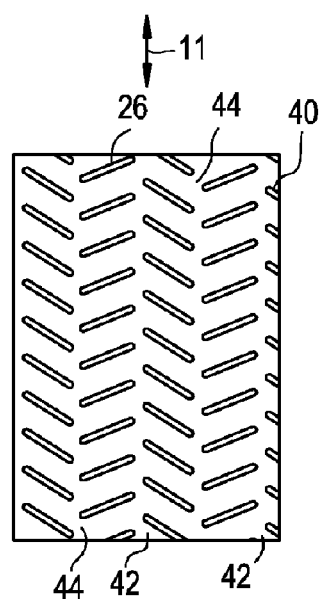
FIG. 3 illustrates an alternative embodiment of the surface of FIG. 2.
Figure 4:
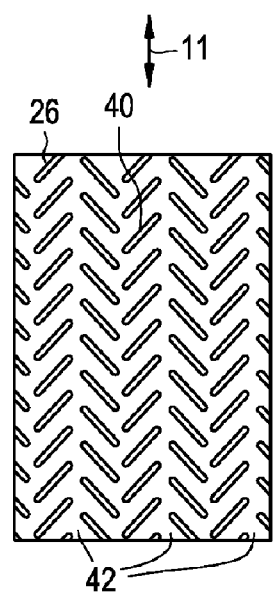
FIG. 4 illustrates an alternative embodiment of the surface of FIG. 2.
Figure 5:
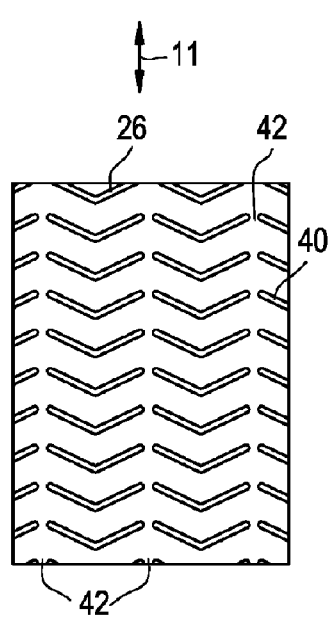
FIG. 5 illustrates an alternative embodiment of the surface of FIG. 2.
Figure 6:
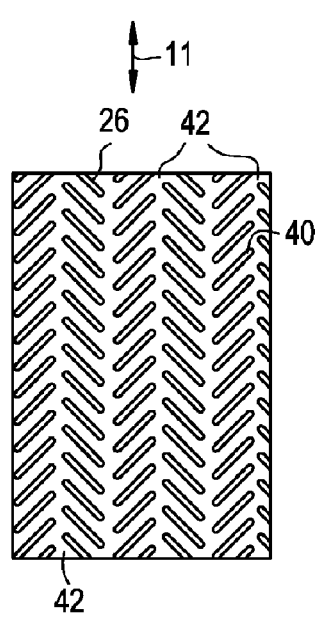
FIG. 6 illustrates an alternative embodiment of the surface of FIG. 2.
Figure 7:
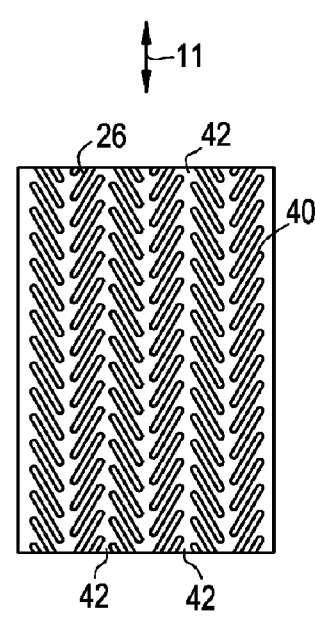
FIG. 7 illustrates an alternative embodiment of the surface of FIG. 2.

Referring to FIG. 1, a can-annular revers-flow combustor 10 is illustrated. The combustor 10 generates the gases needed to drive the rotary motion of a turbine by combusting air and fuel within a confined space and discharging the resulting combustion gases through a stationary row of vanes. In operation, discharge air 11 from a compressor (compressed to a pressure on the order of about 250-400 lb/sq-in) reverses direction as it passes over the outside of the combustors (one shown at 14) and again as it enters the combustor en route to the turbine (fist stage indicated at 16). Compressed air and fuel are burned in the combustion chamber 18, producing gases with a temperature of about 1500° C. or about 2730° F. These combustion gases flow at a high velocity into turbine section 16 via transition piece 20. The transition piece 20 connects to a combustor liner 24 at connector 22, but in some applications, a discrete connector segment may be located between the transition piece 20 and the combustor liner. The combustor liner 24 and the transition piece 20 have an outside surface 26 that the discharge air 11 flows over, which cools the combustor liner 24.

In particular, there is an annular flow of the discharge air 11 that is convectively processed over the outside surface 26 (cold side) of liner 24. In an exemplary embodiment, the discharge air flows through a flow sleeve 28, which forms an annular gap 30 so that the flow velocities can be sufficiently high to produce high heat transfer coefficients. The flow sleeve 28, which is located at both the combustor liner 24 and the transition piece 20, may be two separate sleeves connected together. The flow sleeve 28 has a series of holes, slots, or other openings (not shown) that allow the discharge air 11 to move into the flow sleeve 28 in sufficient quantity without incurring a large pressure drop.

FIGS. 2-7 illustrate alternative embodiments of patterned chevron and broken chevron surfaces that are machined or fabricated on the outside surface 26 (cold side) of the combustor liner 24. In particular, the figures illustrate the general geometry and flow orientation of such surfaces. It is understood that FIGS. 2-7 represent just a portion of the various embodiments that are encompassed by the angled, segmented strips 40. The various embodiments improve upon the cooling augmentation, and in particular convection cooling, that may be obtained on industrial gas turbine combustor liners and transition pieces.

In particular, each of the embodiments illustrate the formation of an array of projecting strips 40 in the specific form of chevrons, i.e., v-shape, or broken chevron strips, which have the base of V-shape removed and may also include a first side of the V-shape offset from the second side of the V-shape so as to create staggered angled strips. The chevron surfaces formed with V-shaped strips in either inline or staggered arrays serve to disrupt the boundary layer flow over the cooling surface, but also to create important secondary flow vortices along the angled strips. These secondary flows add to the heat transfer enhancement and also interact in the regions between chevrons to further mix and disrupt the flows. The edges or ends of these strips also create local shedding vortices. The broken chevron arrays remove the base of the chevrons, thus leaving staggered and oriented strips which act as do the chevrons, but further create additional enhanced flows and heat transfer at the added broken edges.

Figure 8:
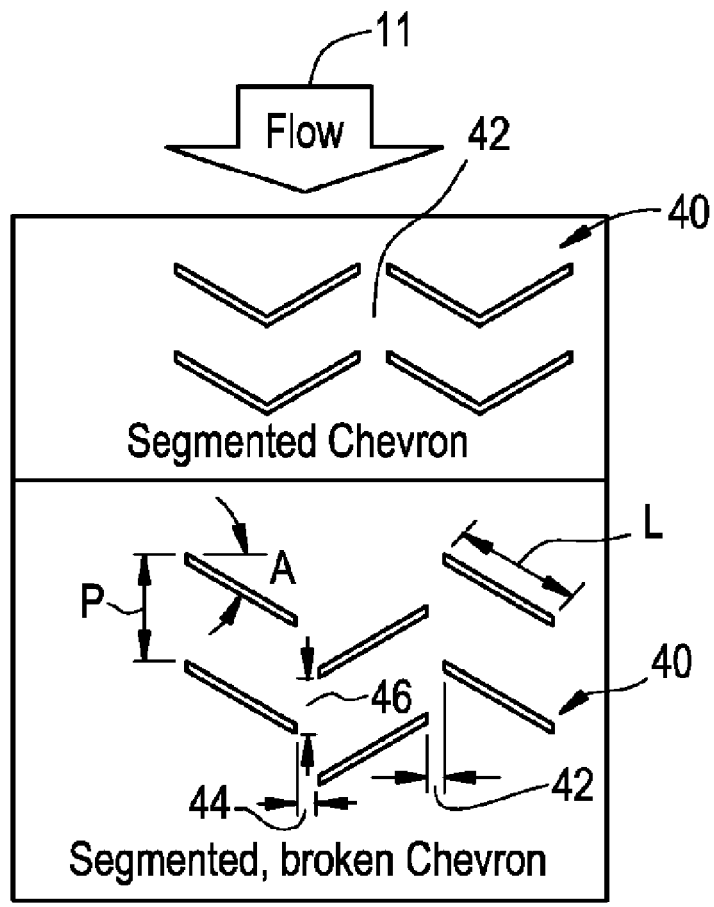
FIG. 8 illustrates the geometry and flow orientation of the surface.
Figure 9:
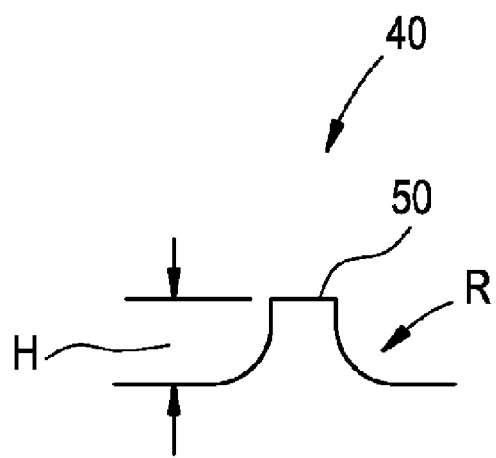
FIG. 9 illustrates a cross-section of one of the strips.

Referring to FIGS. 2-9 and in particular, FIGS. 8 and 9, the strips 40 are segmented so that there are spaces 42 and 44 between the v-shaped strips and the angled strips. Space 42 is the horizontal distance between each of the v-shaped strips. Space 44 is the horizontal distance of the space created when the base of the chevron is removed. There is also a space P, which is in the longitudinal distance between each strip 40. In an exemplary embodiment, spaces 42 and 44 are the same dimension, but it is not required that spaces 42 and 44 be the same dimension. The spaces 42 and 44 create distinct edges in which the discharge air 11 interacts with the edges to create vortices to turbulate the flow. It is noted that while the air flows mainly in the longitudinal direction, the spaces 42 and 44 are formed laterally next to each strip 40.

The v-shaped strips 40 may be staggered so as to create an offset 46, which is defined by the pitch of the strips 40. Each strip 40 is located so as to have the space P between each strip 40. In an exemplary embodiment, the offset 46 is half the distance P between any two strips 40 in the longitudinal direction. The offset 46 can range from about 0.3 of the space P to about 0.7 of the space P.

The different angles A of the strips 40 create a different magnitude of local secondary flow or secondary flow vortices. The amount of the angle A of the strips 40 includes angles of about 30° to about 60° from a horizontal line. Each strip 40 has a length L that is about 1 cm to about 2 cm. One parameter is defined as the ratio between the distance P between the strips to the height H of the strips (P/H). In an exemplary embodiment, the ratio P/H is about 6 to 14. This ratio determines the preferred spacing of the strips in a row of such features so that the flow may reattach to the surface 26 between each strip for best heat transfer. Another parameter is the spacing 42 between rows of surface strips. This spacing must be large enough to allow the generation of flow vortices freely from the edges of the strips. In an exemplary embodiment, this spacing 42 is from 5 to 10 times the height H. There is no upper limit to this spacing 42 as he adjacent strip edges will continue to generate vortices even if the spacing is very large. However, spacing 42 is related to the overall surface area augmentation achieved by these enhancement geometries in that a closer spacing means more features and more added surface area For a large combustor chamber of about 14 to 16 inch (35.5 to 40.6 cm) in diameter, an exemplary embodiment of the height H of the strips 40 is between 0.020 inches (0.051 cm) and 0.120 inches (0.305 cm). Spacing 42 and height H of the strips 40 may vary along the surface array as desired to achieve some tailoring of cooling augmentation. Moreover, by utilizing the strips in the segmented chevron and segmented, broken chevron patterns, the surface area that the discharge air 11 (coolant) interacts with increases by up to approximately 25% as compared to using no strips on the outside of the liner.

FIG. 9 also shows that at the base of the strip there is a radius R, which helps reduce the stress at each of the strips. In addition, in an exemplary embodiment, the strip will have a flat top 50 so as to allow better turbulence of the flow of the discharge air. It will be appreciated that the radius and flat top are typical of machined strips and that other fabrication methods are contemplated and may result in rounded tops or very small radii at the base.

The spaces 42, 44 and offset 46 provide additional disturbance to increase the turbulation of the flow. The increase in turbulation allows the flow of the discharge air 11 to be stirred up at the outside surface 26 of the liner, which brings fresh discharge air down to the outside surface of the liner. In other words, discharge air that is further away from the surface and thus, is cooler, is brought to the liner surface, thereby allowing the cooler air to enhance the heat transfer rate of the surface. It is noted that if the strips 40 are too close together, the air flow may actually be isolated away from the surface to be cooled. In addition, if the strips 40 are too small, the surface features will no longer create substantial secondary flows along the direction of the strips 40.

The strips 40 are oriented in a specified manner so that the bulk discharge air 11 flows across the strips 40 in the longitudinal direction. The flow of air generates numerous and well placed edge vortices in the flow immediately adjacent to the surface to be cooled. It is noted that the flow in the longitudinal direction can be from either the top to the bottom or the bottom to the top direction, shown as the double arrow. While the arrow shows the flow as flowing from either the top to the bottom or the bottom to the top, the change in direction indicates alternate orientations of the strips 40 and not a change in the direction of the main flow between the combustor liner and the flow sleeve, or between the transition piece and the flow sleeve. These shaped and oriented strips also perform the function of adding substantial surface area for heat flux capability, as well as distributing a more uniform cooling augmentation over the entire surface.

The method of forming the strips 40 on the outside surface 26 may be accomplished through casting, machining, brazing, welding, or specific deposition techniques such as laser consolidation, etc., which allow the strips 40 to be formed on the liner 24 after the liner 24 has been formed. Thus, the strips 40 may be integrated as part of the liner 24 or may be added to the liner 24 after the liner has been formed. If the strips 40 are integrated as part of the liner 24 (e.g., machining, casting, etc.), then the strips 40 are fully engaged with liner 24 and there is no interface at the liner with the strips. Thus, there is full thermal contact with the strips 40 that are integrated with the liner 24, which will improve the heat transfer as the discharge air 11 passes over the strips 40. Alternatively, the strips may be applied to the surface 26 and then bonded in such a way as to provide a seamless interface with the outside surface 26 of the liner.

The strips provide higher thermal enhancement as compared to conventional methods in the prior art, and specifically so at the Reynolds number, e.g., 500,000 to 1,000,000, typical of the combustor cooling passage. Recent information has shown that the conventional practice of using transverse turbulators on the liner cooling surface results in a reduced heat transfer augmentation factor as the cooling flow Reynolds number is increased to the very high levels used for low emissions combustors, eg. Reynolds numbers on the order of 500,000 to 1,000,000. The exemplary embodiments discussed herein provide for an increase in the heat transfer coefficient augmentation factor by 15 to 25%, plus an additional 10 to 20% surface area, for a total increase of 20 to 40% heat flux or cooling capability. The strips 40 also have the unexpected benefit of attaining their augmentation levels almost immediately from the location of the surface treatments, as well as holding constant levels along the surface, both characteristics that are not found in the conventional turbulated surfaces.

Figure 10:
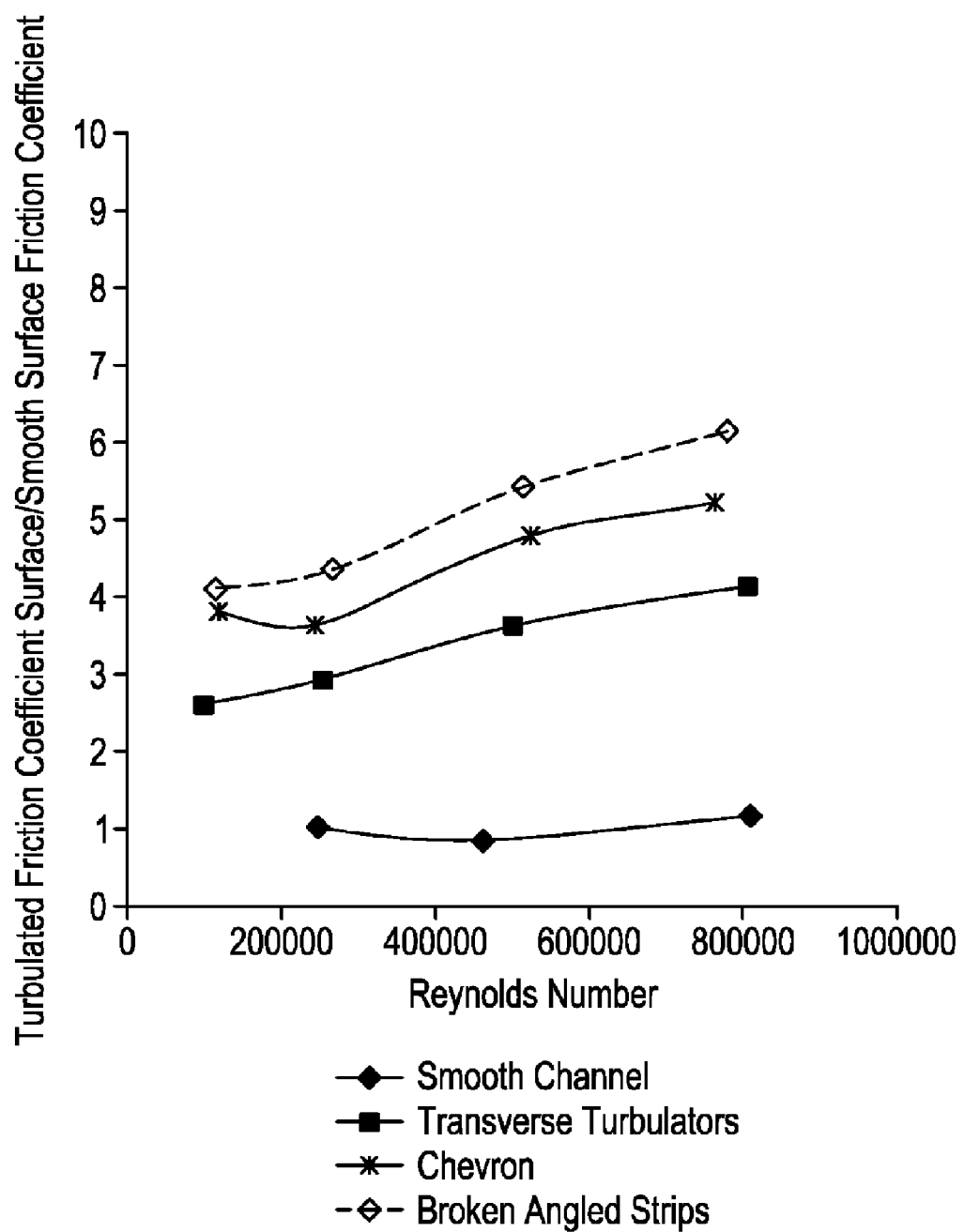
FIG. 10 is a graph illustrating the Reynolds number versus ratio of the turbulated friction coefficient surface to the smooth surface friction coefficient.
Figure 11:
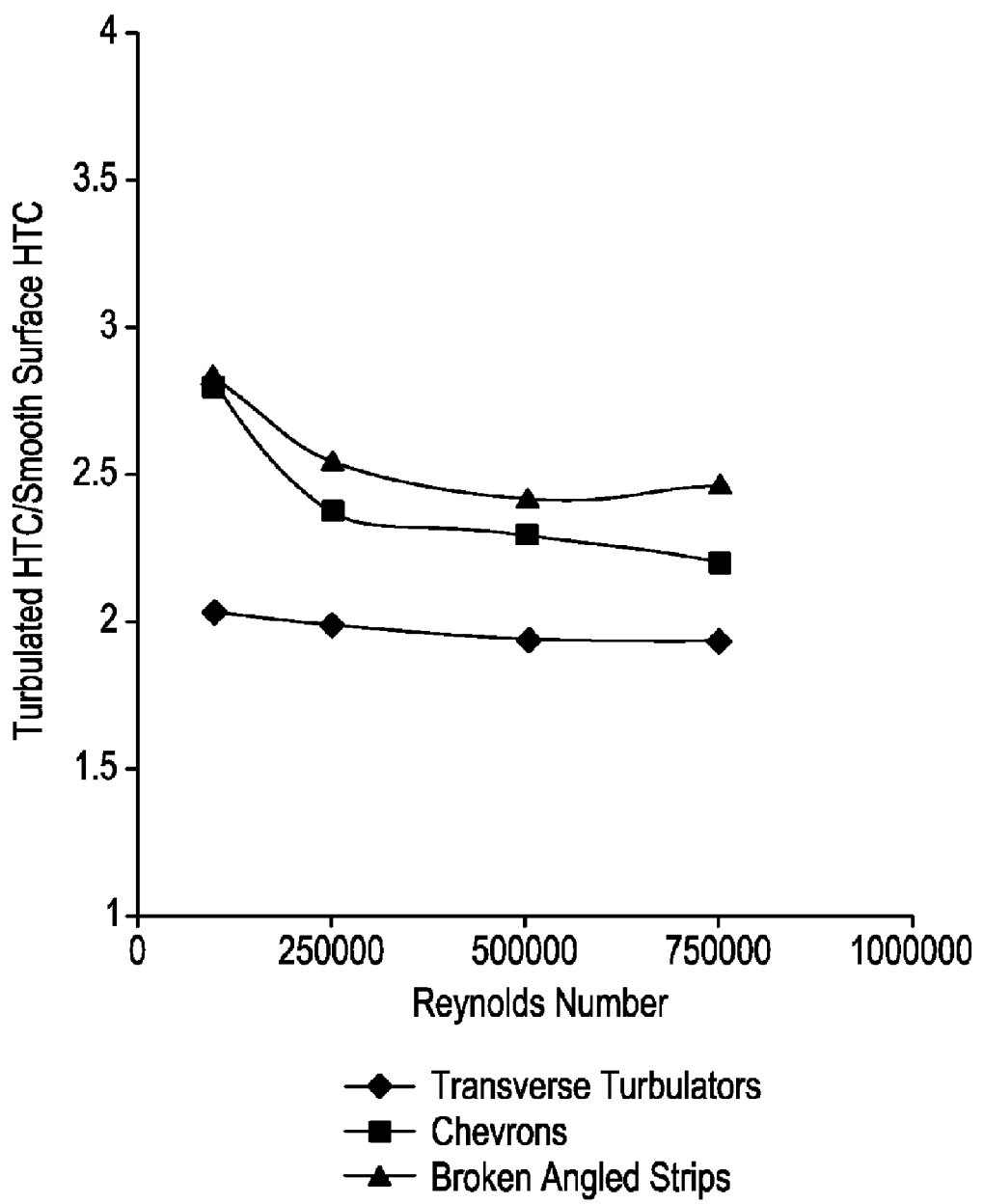
FIG. 11 is a graph illustrating the Reynolds number versus the ratio of the turbulated heat transfer coefficient ("HTC") to the smooth surface HTC.

FIGS. 10 and 11 show the advantages of using the segmented strips. In FIG. 10, the horizontal axis represents the Reynolds number and the vertical axis represents the ratio of the turbulated friction coefficient surface to the smooth suede friction coefficient. This figure indicates how the turbulation is greater at all of the various Reynolds numbers or flow volumes (and especially the high Reynolds numbers) for both the broken angled strips 40 and the v-shaped strips 40 as compared to the smooth surface, which has no strips, and the transverse turbulators, which are horizontal strips across the surface. In FIG. 11, the horizontal axis represents the Reynolds number and the vertical axis represents the ratio of the turbulated heat transfer coefficient ("HTC") to the smooth surface HTC. This figure indicates how the heat transfer coefficient is greater at all of the various Reynolds numbers or flow volumes (and especially the high Reynolds numbers) for both the broken angled strips 40 and the v-shaped strips 40 as compared to the transverse turbulators, which are horizontal strips across the surface.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms fir second, etc. are used to distinguish one element from another.

What is claimed is:

1. A combustor liner for a gas turbine comprising:
a body having a plurality of angled strips on an outside surface of said combustor liner and arranged in an array about said outside surface; and
a space between each of said plurality of angled strips so as to create vortices in a cooling air flowing in a longitudinal direction across said outside surface of said combustor liner, said space including a lateral empty space disposed between each of said plurality of angled strips.

2. The combustor liner of claim 1, wherein each of said angled strips has a V-shape.

3. The combustor liner of claim 1, wherein each of said angled strips has a V-shape and a base of said V-shape is removed.

4. The combustor liner of claim 1, wherein each of said angled strips has a V-shape and a base of said V-shape is removed so as to create a first side and a second side, said first side is offset longitudinally from said second side.

5. The combustor liner of claim 4, wherein said first side is offset from said second side by about 0.3 to about 0.7 of a total longitudinal distance between each of said angled strips.

6. The combustor liner of claim 4, wherein said space includes said base that has been removed of said V-shape, said lateral empty space disposed between each of said V-shape, and a longitudinal space between each of said angled strips.

7. The combustor liner of claim 6, wherein said base that has been removed of said V-shape has a dimension that is the same as said lateral empty space.

8. The combustor liner of claim 1, wherein each of said plurality of angled strips has a flat top.

9. The combustor liner of claim 1, wherein each of said plurality of angled strips has a bottom section, which transitions to said outside surface though a radiused fillet.

10. The combustor liner of claim 1, wherein each of said plurality of angled strips has a height of about 0.02 inches to about 0.12 inches.

11. The combustor liner of claim 1, wherein said space includes a longitudinal space and said lateral empty space, said longitudinal space between each of said angled strips is defined by a ratio of said lateral empty space between each of said angled strips to a height of each of said angled strips, said ratio ranges from approximately 6 to approximately 14.

12. The combustor liner of claim 11, wherein said lateral empty space is defined by about five to about ten times a height of each of said angled strip.

13. The combustor liner of claim 1, wherein each of said angled strips has an angle from a horizontal direction, said angle ranges from about 30° to about 60°.

14. The combustor liner of claim 1, wherein said body is enclosed within a flow sleeve, said cooling air flows between said flow sleeve and said body.

15. The combustor liner of claim 1, wherein said plurality of angled strips are formed by disposing said plurality of angled strips on said outside surface.

16. The combustor liner of claim 1, wherein said plurality of angled strips are formed by integrating said plurality of angled strips with said outside surface.

17. A method of fabricating a combustor liner, the method comprising:
forming a plurality of angled strips on an outside surface of said combustor liner and arranged in an array about said outside surface, each of said plurality of angled strips disposed so as to be spaced laterally apart with an empty space therebetween to create vortices in a cooling air flowing across said outside surface of said combustor liner.

18. The method of claim 17, wherein said forming includes integrating said plurality of strips on said outside liner.

19. The method claim 17, wherein said forming includes disposing said plurality of strips on said outside liner.

* * * * *